United States Patent [19]

Loggers

[11] Patent Number: 4,677,753

[45] Date of Patent: Jul. 7, 1987

[54] COLLISION RISK ASSESSMENT SYSTEM

[76] Inventor: John J. Loggers, P.O. Box 62, Red Bank, N.J. 07701

[21] Appl. No.: 830,441

[22] Filed: Feb. 18, 1986

[51] Int. Cl.⁴ ............................................. G01C 21/04
[52] U.S. Cl. ...................................................... 33/264
[58] Field of Search ................ 33/264, 241, 277, 276, 33/278; 116/28 R

[56] References Cited

U.S. PATENT DOCUMENTS

| | | | |
|---|---|---|---|
| 1,871,532 | 8/1932 | Kenna | 33/264 |
| 3,834,038 | 9/1974 | Scarritt | 33/264 |
| 4,257,706 | 3/1981 | Smith | 33/264 X |
| 4,471,415 | 9/1984 | Larson | 362/250 |

FOREIGN PATENT DOCUMENTS

| | | | |
|---|---|---|---|
| 691090 | 7/1930 | France | 33/264 |
| 567714 | 10/1957 | Italy | 33/264 |
| 171919 | 6/1960 | Sweden | 33/264 |

Primary Examiner—Harry N. Haroian

[57] ABSTRACT

A Collision Risk Assessment System employs a plurality of sights located in front of and to the rear of a vehicle which may be an automobile, boat, plane etc. The sights may be in groups of three sights allowing the vehicle's operator to locate the center and the sides of the vehicle to the front and rear relative to the roadway, waterway, etc. The sights are laterally adjustable and are illuminated. The lateral adjustment permits the sights to be located as a function of the size of the vehicle's operator.

1 Claim, 7 Drawing Figures

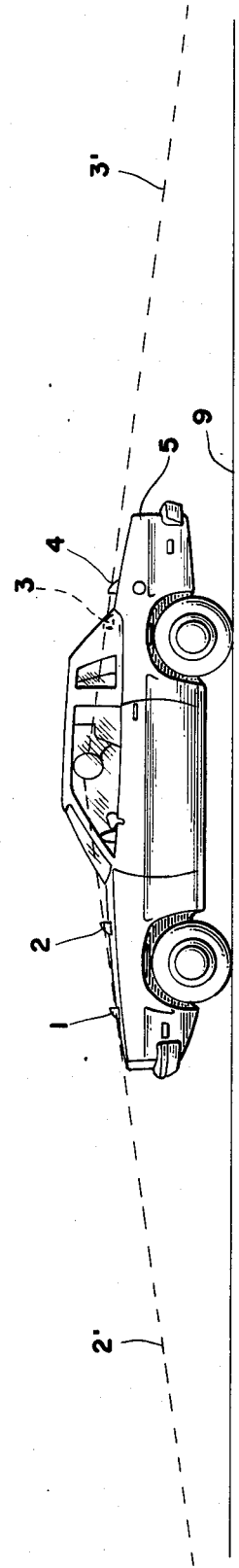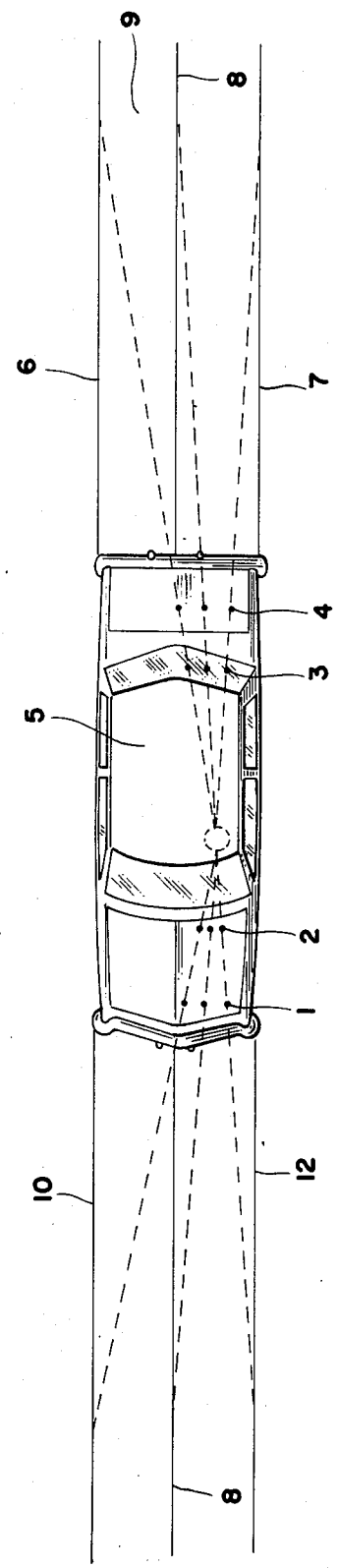

COLLISION RISK ASSESSMENT SYSTEM

SUMMARY OF THE INVENTION

This invention relates to a device that enables the operator of a moving or a stationary vehicle to accurately and continuously gauge the amount of available space visible ahead or behind the vehicle. "Operator" means the driver of a motor vehicle, the pilot of a plane, or the helmsman of a boat. "Vehicle" may be a motor vehicle, airplane, boat, etc. The invention enables the operator to judge the space in front of, behind or to the sides of the vehicle without the need to take his or her eyes off the roadway, runway or waterway.

The device consists of a system of guides or sights mounted on the vehicle. For optimum effectiveness, the guides are located so that they project against the surface of the roadway, runway or waterway, but are of a size such that they are nondistractive and do not block or otherwise hinder the operator's normal ability to visualize. By "project", it is meant that the guides appear in the line of sight between the operator and the surface of the roadway, etc. With normal operator posture, the guides correlate linearly with the sides of the vehicle and the center of the vehicle. The guides thus represent the exact width and spatial relationship of the vehicle to the traffic lines, buoys, stationary or moving objects whether same are visible in front of or behind the vehicle.

The sights can be positioned to meet the requirements of the design of the vehicle and other requirements respecting the height of the average operator. Adjustment means are provided for each guide to be finely set for each particular operator. The guides can be transferred by moving them from one vehicle to another or they may be permanently affixed to a vehicle. By utilizing the system of guides, the operator will be better able to avoid objects in or near the vehicle's path or, as required, to locate the vehicle in proximity to the object.

As most vehicle operators have a limited concept of the width of their vehicle and how the sides and center of the vehicle relate to objects in the path of the vehicle, the present invention enables the operator to confidently operate the vehicle without fear of coming too close to other vehicles or other objects in the path of the vehicle.

The primary object of this invention is to provide a system of guides which take the guesswork out of operating a vehicle.

Another object of the invention is to provide a plurality of sights to afford the operator of a moving or a stationary vehicle with the means to continuously visualize the vehicle's dimensions.

A further object of the invention is the provision of a system of sights which will permit the operator to determine if the vehicle will navigate its intended path by determining how the vehicle fits into traffic.

A further object of the invention is to provide a plurality of sights to enable the vehicle's operator to avoid objects in the front, rear, or to the sides of the vehicle.

A further object of the invention is to make it easier for the operator to act more readily and rapidly when confronted with the possibility of a collision.

Another object of the invention is to enable the operator to engage in the proper evasive action and to limit such actions to those that are necessary and then, only to the degree necessary to avoid the collision.

A further object of the invention is to enable the operator to position the vehicle such that it will pass over or straddle an object in the pathway such as a pothole or broken glass.

Another object of the invention is the provision of a system which serves as a constant reminder to the operator to maintain the vehicle's position relative to traffic conditions, roadway markings and/or obstacles.

BRIEF DESCRIPTION OF THE DRAWINGS

The foregoing objects and advantages of the invention will become apparent to those skilled in the art from a review of the detailed specification of the invention which follows, reference being made to the accompanying drawings in which:

FIG. 1 is a diagrammatic view of the invention mounted on an automobile;

FIG. 2 is a top view of the showing of FIG. 1;

DETAILED DESCRIPTION OF THE INVENTION

Figure 3:
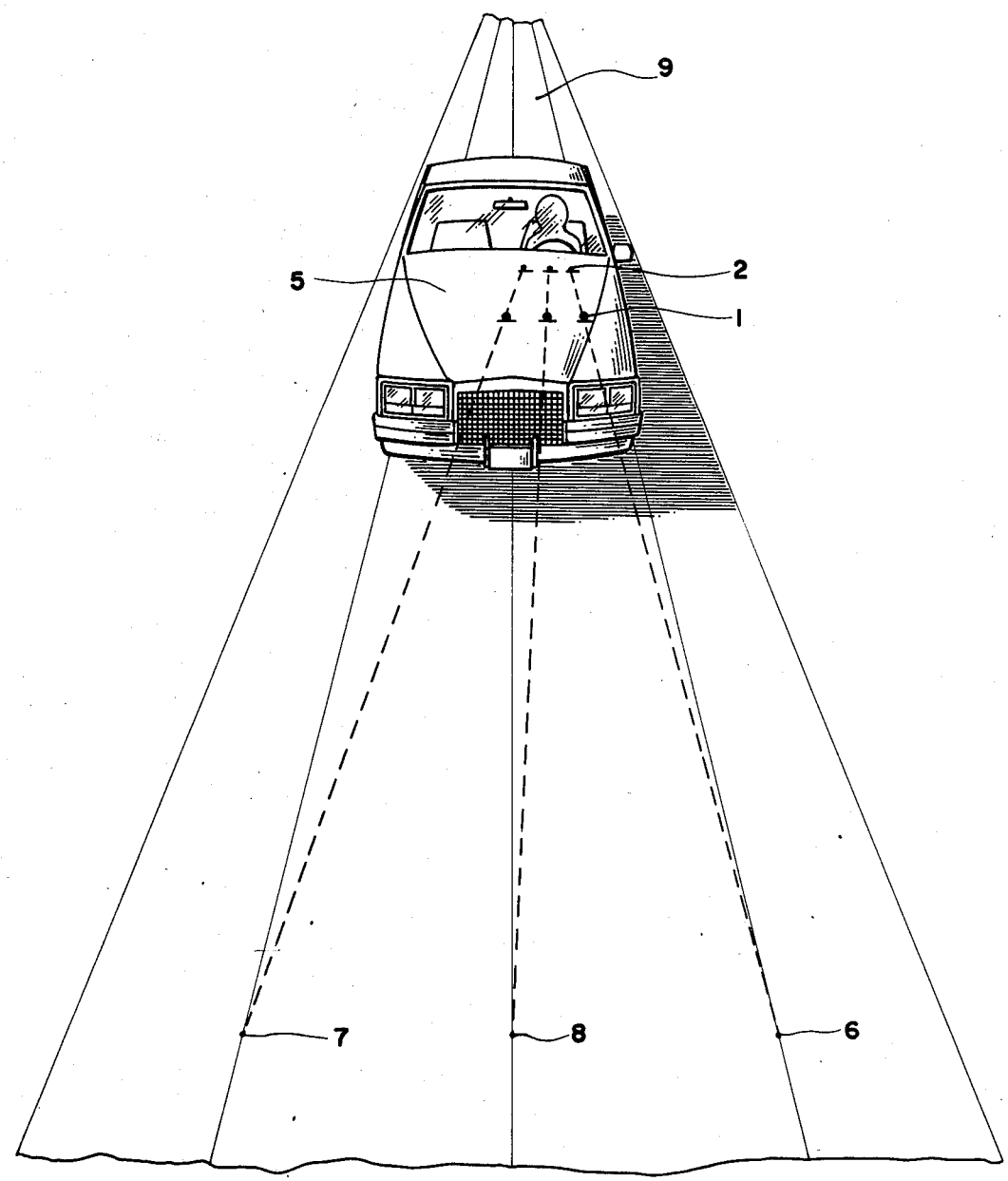
FIG. 3 is a perspective view of the front of an automobile employing the invention.

In FIG. 1, an automobile 5 is shown in side view on the surface of a roadway 9. Four sets of sights; 1, 2, 3 and 4 are mounted on the automobile: sets 1 and 2 being mounted on the front of the vehicle (such as both being located on the hood, or set 1 mounted on the hood and set 2 mounted near the window sill), and sets 3 and 4 being mounted on the rear of the vehicle (such as both sets being mounted on the trunk or set 4 being on the trunk while set 3 is mounted on the rear window ledge).

Broken lines 1', 2', 3' and 4' are lines of sight from the operator's position through sets of sights 1, 2, 3 and 4, respectively.

The locations of the sights shown in FIG. 1 are the four most common locations. These locations have been found to accomodate operators of different heights so that the guides can be used by the operators without impairing their visibility.

FIG. 2 is a top view of the arrangement of sights shown in FIG. 1. In the showing of FIG. 1, the operator is using a lineup of the sights of sets 1 and 2 to the front of the vehicle and sets 3 and 4 to the rear of the vehicle with each set consisting of three sights each. Roadway 9 is shown having a line 8 to the front and rear of the vehicle, side lines 6 and 7 to the front of the vehicle, and side lines 10 and 12 to the rear of the vehicle. These lines, 6, 7, 8, 10 and 12 denote the center and the front and rear sides of the vehicle, respectively. The broken lines are lines of sight from the operator's position through the sets of guides.

FIG. 3 is a front perspective view of the vehicle 5 showing two sets of three sights each, 1 and 2, mounted on the hood of the vehicle. Roadway 9 has lines 8 delineating the center of the vehicle and 6 and 7 denoting the front sides of the vehicle. The broken lines are the lines of sight from the operator's position using the sights to locate the vehicle's sides and center as delineated by lines 6, 7, and 8, respectively.

Figure 4:
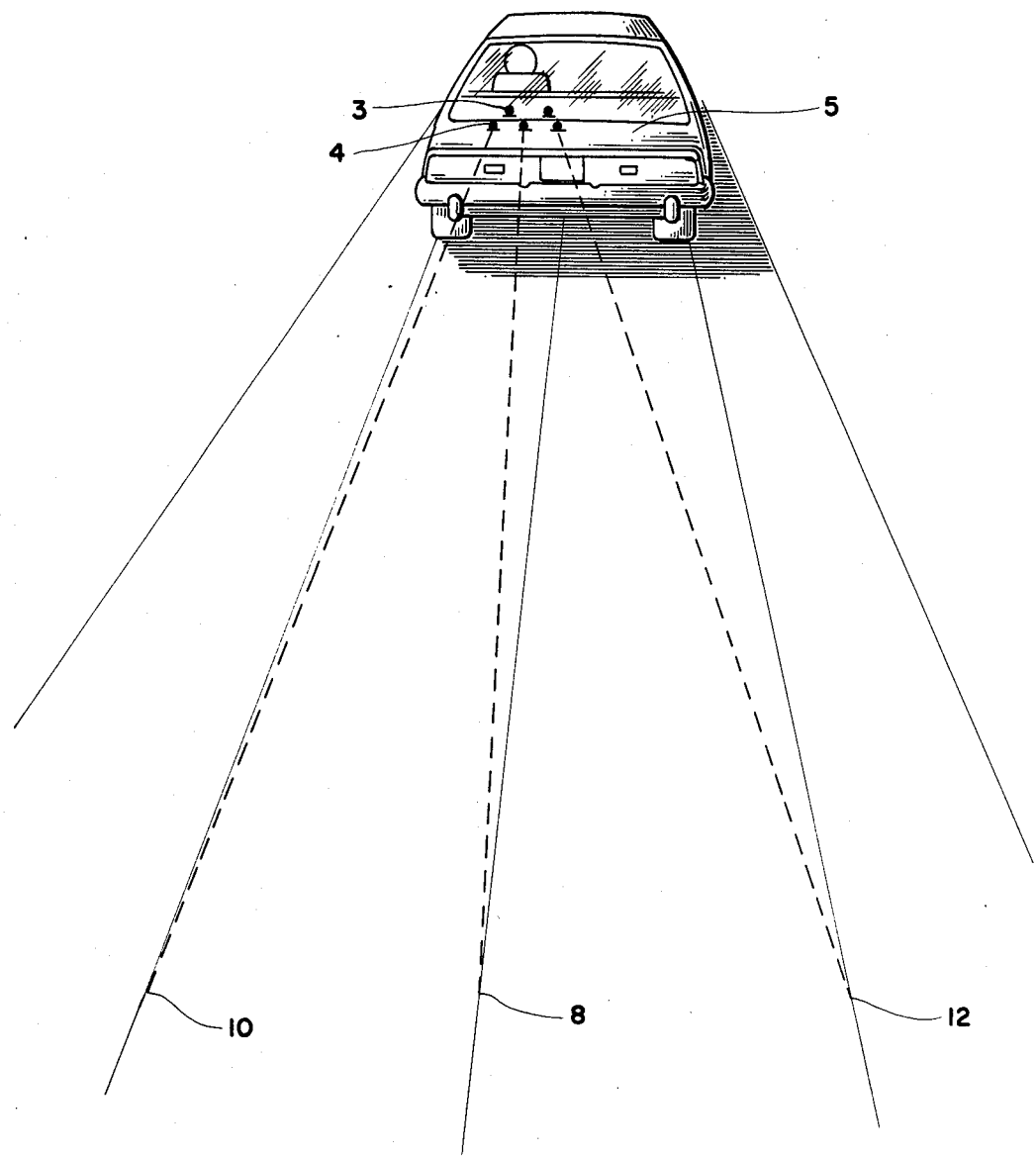
FIG. 4 is a perspective view of the rear of an automobile employing the invention.

Similarly, FIG. 4 is a rear perspective view of the vehicle 5 showing two sets of three sights each, 3 and 4, mounted on or near the rear window sill (set 3), and on the trunk of the vehicle (set 4). The broken lines are lines of sight from the operator's position, using the sights, to locate the vehicle's center and sides as delineated by lines 8, 10 and 12, respectively.

Figure 5A:
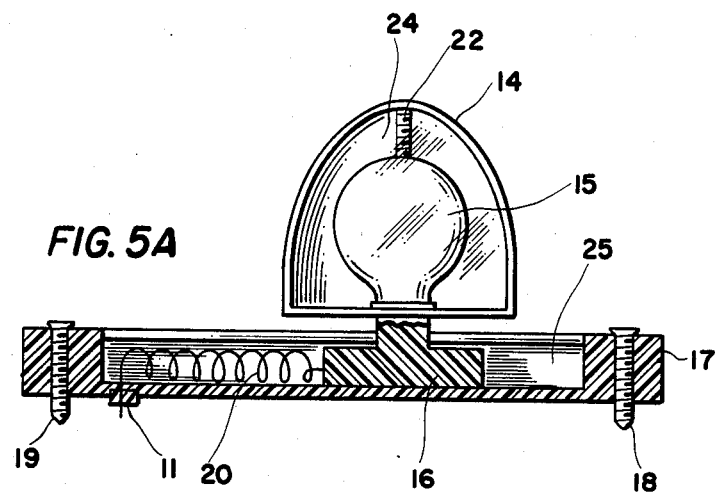
FIG. 5A is a front view of one of the sights employed in the invention.

FIG. 5A is a front view of one of the sights used in the sets of three sights, 1, 2, 3 and 4. The sight is illuminated by light bulb 15 mounted in a weatherproof housing 14. The face of the housing 14 is formed of clear material forming a lens 24 so that the light can be seen by the operator. The sight is adjustable laterally via a slide mounting in base 17. The entire assembly may be fastened to the vehicle via screws 18 and 19. Thus, base 17 has a channel 25 formed therein for supporting a lockable slide assembly 21. As more clearly shown in FIG. 5B, another screw 22 within apertures in housing 14 traversing through the housing into locking base 21 so that, when the screw 22 is tightened, the base 21 bears against the base 17 to hold the housing 14 in the desired lateral position.

Numeral 11 in FIG. 5A shows an aperture through which an electrical wire 20 is permitted to travel to supply current to the light 15. The wire 20 is of sufficient length to permit the housing 14 to move from full left to full right in channel 25.

Figure 5C:
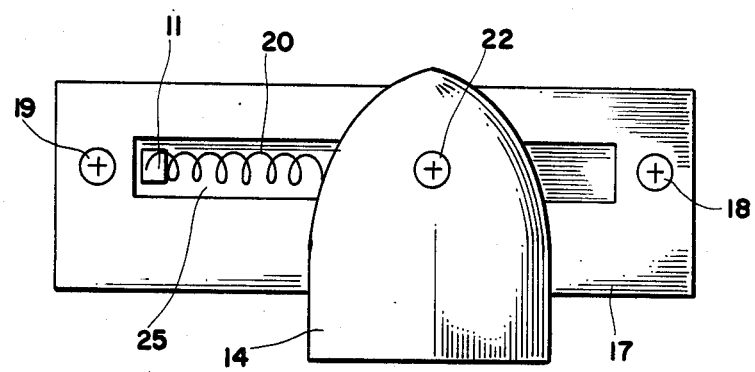
FIG. 5C is a top view of the sight shown in FIG. 5A.
Figure 5B:
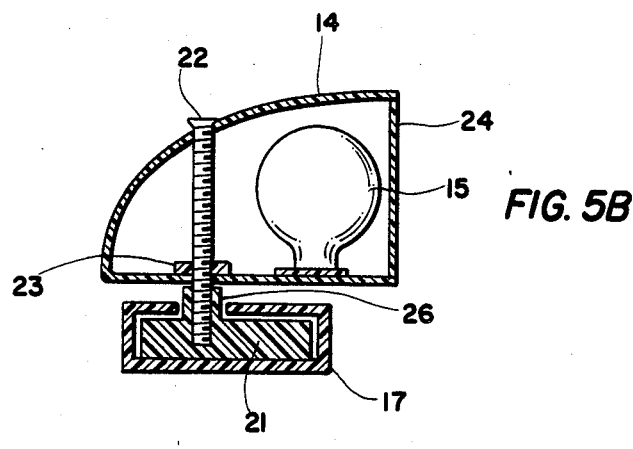
FIG. 5B is a side view of the sight shown in FIG. 5A.

FIG. 5B is a side view of the sight of FIG. 5A. A washer 23 in the base of housing 14 supports screw 22. Locking slide 21 has a raised portion, 26, if desired, to provide the necessary amount of travel for screw 22 to tighten locking slide 21 against and within the base 17.

FIG. 5C is a top view of the sight of FIG. 5A. As shown therein, base 17 has channel 25 formed therein. Housing 14 may be adjusted from full left to full right within the channel 25.

The brightness of the lights may be controlled by a dimmer. The lights in the guides may be capable of being operated independently of the vehicle's regular lighting system. The lights may be of different colors, may be flashing independently of or connected to the vehicle's flasher system; may be blinking independently of or connected to the vehicle's own regular directional blinking system; and may be made visible from the front of the lights to provide illumination and as a safety factor. The lights may also be tied to the vehicle's speedometer to be illuminated as the vehicle reaches a predetermined series of speeds.

Having thus described the invention, what is claimed as new and desired to be protected by Patent is set forth in the appended claims:

1. A vehicular distance judgment device comprising a plurality of sights mounted in groups on the front and rear of a vehicle within the line of sight of the vehicle's operator, said sights being illuminated and adjustable laterally for assisting said operator to judge the position of the vehicle relative to objects in the path of said vehicle, wherein said device includes a base having a channel formed therein, and each said plurality of sights comprising a housing illumination means mounted in said housing, and means connected between said housing and said base for adjustably mounting said housing on said base in said channel, said mounting means includes a slidably mounted locking member mounted in said channel, screw threaded means connected between said locking means and said housing, and washer means connected between said screw threaded means and said locking means for supporting and anchoring said screw threaded means, and a further plurality of sights mounted between the location of the first set of sights and the operator to establish the line of sight, and said base including means for supplying power to said illuminating means.

* * * * *